United States Patent [19]
Goto

[11] Patent Number: 6,046,855
[45] Date of Patent: *Apr. 4, 2000

[54] LENTICULAR LENS SHEET AND PROCESS FOR PRODUCING THE SAME

[75] Inventor: Masahiro Goto, Tokyo-To, Japan

[73] Assignee: Dai Nippon Printing Co., Ltd., Japan

[*] Notice: This patent is subject to a terminal disclaimer.

[21] Appl. No.: 09/175,408

[22] Filed: Oct. 20, 1998

[30] Foreign Application Priority Data

Oct. 22, 1997 [JP] Japan ................................. 9-289342

[51] Int. Cl.⁷ .......................... G02B 27/10; G02B 27/14
[52] U.S. Cl. ............................................. 359/619; 359/629
[58] Field of Search ..................................... 359/619, 629

[56] References Cited

U.S. PATENT DOCUMENTS

| | | | |
|---|---|---|---|
| 5,400,114 | 3/1995 | Yoshida et al. | 359/457 |
| 5,880,887 | 3/1999 | Goto | 359/626 |
| 5,885,490 | 3/1999 | Kawaguchi et al. | 264/1.32 |
| 5,903,399 | 5/1999 | Yamashita et al. | 359/724 |

FOREIGN PATENT DOCUMENTS

| | | | |
|---|---|---|---|
| 0 371 432 A3 | 6/1990 | European Pat. Off. | G02B 21/62 |
| 40 05 933 A1 | 8/1991 | Germany | G02B 21/62 |

OTHER PUBLICATIONS

Patent Abstracts of Japan; vol. 016, No. 009 (P–1296); Jan. 10, 1992 & JP 03 230101 A (Matsushita Electron Corp); Oct. 14, 1991 *abstract*.

Patent Abstracts of Japan; vol. 016, No. 296 (P–1378); Jun. 30, 1992 & JP 04 078839 A (Dai Nippon Printing Co Ltd); March 12, 1992 *abstract*.

Patent Abstracts of Japan; vol. 096, No. 008; Aug. 30, 1996 & JP 08 090663 (Toppan Printing Co Ltd); Apr. 9, 1996 *abstract*.

Patent Abstracts of Japan; vol. 097, No. 004; Apr. 30, 1997 & JP 08 320407 A (Matsushita Electric Ind Co Ltd); Dec. 3, 1996 *abstract*.

*Primary Examiner*—Georgia Epps
*Assistant Examiner*—Saeed Seykafi
*Attorney, Agent, or Firm*—Parkhurst, Wendel, L.L.P.

[57] ABSTRACT

A lenticular lens sheet comprising a base member in the form of a film or sheet, and a lens area including lenticular lenses convexly formed on the light-entering surface of the base member. The lens area is formed by using an ionizing-radiation-curable resin such as an ultraviolet-light- or electron-beam-curable resin. A non-colored layer which is substantially transparent and non-colored is formed in each lenticular lens on the base side thereof; and a colored layer is formed in each lenticular lens along the light-entering surface thereof. The colored layer has the function of enhancing the contrast of the incident-side single lenticular lens sheet. According to this lenticular lens sheet, it is possible to obtain enhanced contrast by preventing the reflection of extraneous light without lowering the intensity of imaging light so much, and to make the lenticular lens pitch extremely small.

14 Claims, 12 Drawing Sheets

LENTICULAR LENS SHEET AND PROCESS FOR PRODUCING THE SAME

BACKGROUND OF THE INVENTION

1. Field of the Invention

The present invention relates to a lenticular lens sheet suitable for projecting an image by using an imaging light source having cell structure such as an LCD (liquid crystal display) or DMD (digital micro-mirror device), and to a process for producing such a lenticular lens sheet.

2. Related Art

Heretofore, there has been known a rear-projection-type television comprising an imaging light source composed of three CRTs (cathode ray tubes) of red, green and blue, and a rear projection screen on which an image is projected by the imaging light source.

In such a projection television, a screen which is a combination of a Fresnel lens sheet and a lenticular lens sheet is used as the rear projection screen. Of these lens sheets, the lenticular lens sheet is required to diffuse light widely, and to be less affected by extraneous light.

FIG. 13 is a view showing one example of a conventional lenticular lens sheet. In a lenticular lens sheet 40 shown in FIG. 13, a lens area 42 containing a plurality of lenticular lenses for condensing light (hereinafter sometimes referred to simply as "lenses") is formed on the light-entering surface 41 of the lenticular lens sheet 40; and a light-emerging surface 44 is formed in the vicinity of the focal point (condensing point) of each lens in the lens area 42. A non-light-emerging area 47 containing light-shielding parts (black stripes) 48 is provided on the light-emerging surface 44, between the focal points of each two lenses in the lens area 42, so that it is possible to diffuse light and to reduce the effect of extraneous light.

In the field of the above-described projection television, there has also been developed a television using an LCD, DMD or the like as the imaging light source. Also in such a projection television, a lenticular lens sheet with black stripes as shown in FIG. 13 is used from the viewpoints of improvement in the light-diffusing property and prevention of the reflection of extraneous light.

However, in the projection television using an LCD, DMD or the like as the imaging light source, a grating pattern originating from the cell structure of the LCD, DMD or the like is projected on the rear projection screen. The lenticular lens sheet for use in the rear projection screen has a cyclic structure with a constant pitch. Therefore, when an image is projected on such a lenticular lens sheet, Moire fringes formed due to the sampling effect of the lenticular lenses may be observed.

In order to prevent the formation of such Moire fringes, it is preferable to make the lenticular lens pitch not greater than ⅓.₅ of the grating space of the grating pattern projected. Further, in the projection television using an LCD, DMD or the like, glaring of the projected image called scintillation occurs. To make the lenticular lens pitch small is also useful for reducing this scintillation. It has already been known that, in the lenticular lens sheet with black stripes as shown in FIG. 13, it is generally required to make the distance between the lenticular lenses formed on the light-entering surface and the light-emerging surface not more than approximately 1.3 times the lenticular lens pitch if it is desired to diffuse light widely at a diffusion angle of 40 degrees or more, and to form black stripes on the light-emerging surface.

For this reason, in the lenticular lens sheet with black stripes as shown in FIG. 13, the lenticular lens pitch is made 0.4 mm or less, and the thickness of the lenticular lens sheet, which corresponds to the distance between the lenticular lenses and the light-emerging surface, is made 0.54 mm or less so that Moire fringes formed due to the grating pattern projected on the rear projection screen and the cyclic structure of the lenticular lenses will be vague.

However, in the lenticular lens sheet with black stripes as shown in FIG. 13, when the thickness of the lenticular lens sheet is made small, the rigidity of the lens sheet is decreased, so that it becomes difficult to maintain the lenticular lens sheet flat. Moreover, it is extremely difficult to accurately mold such a thin lenticular lens sheet by means of extrusion molding or the like.

On the other hand, in the above-described projection television using an LCD, DMD or the like, an emergent-side single lenticular lens sheet, an incident-side single lenticular lens sheet or the like which has been colored is also used in order to improve the light-diffusing property and to prevent the reflection of extraneous light.

In the emergent-side single lenticular lens sheet, the shape of a part of a circle or ellipse, or a shape utilizing total reflection is adopted as the shape of the cross section of the lenticular lens. However, in the case where the shape of the cross section of the lenticular lens is a part of a circle or ellipse, total reflection occurs when the lens angle formed with incident light at the base of the lens exceeds the critical angle. Therefore, the viewing angle cannot be made wide. Further, in the case of the shape utilizing total reflection, it is impossible to accurately transfer the lens pattern by means of extrusion molding because of its peculiar shape. Consequently, it is inevitable to produce such a lenticular lens sheet by a cast molding method which is poor in productivity.

FIG. 14 is a view for illustrating the relationship between the inclination of a lens at the point at which light enters into an incident-side single lenticular lens sheet, and the emergent angle of this light. As shown in FIG. 14, in an incident-side single lenticular lens sheet 60, a lens area 62 containing a plurality of lenticular lenses for condensing light is formed on the light-entering surface 61 of the lenticular lens sheet 60. In FIG. 14, the symbol $\phi$ represents the lens angle (inclination) at the base of each lens in the lens area 62; the symbol $\theta$ represents the emergent angle of light which has entered into the base of each lens in the lens area 62; the symbol h represents the height of the lens area 62; and the symbol L represents the distance between the incident point (the base of each lens in the lens area 62) and the condensing point.

The relationship between the lens angle $\phi$ at the base of the lens, and the emergent angle $\theta$ and the position of the condensing point is shown in the following Table 1, where the refractive index n of the lenticular lens sheet is 1.5, and the lens pitch p is 1.0 mm.

TABLE 1

| (n = 1.5, p = 1.0 mm) | | | |
|---|---|---|---|
| $\phi$[deg] | $\theta$[deg] | L[mm] | H[mm] |
| 30 | 15.9 | 2.69 | 0.14 |
| 40 | 22.3 | 1.92 | 0.19 |
| 50 | 29.7 | 1.42 | 0.26 |

TABLE 1-continued (n = 1.5, p = 1.0 mm)

| φ[deg] | θ[deg] | L[mm] | H[mm] |
|---|---|---|---|
| 60 | 38.9 | 1.08 | 0.33 |
| 70 | 51.0 | 0.83 | 0.42 |

It can be understood from the data shown in the above Table 1 hat, in the incident-side single lenticular lens sheet 60 as shown in FIG. 14, it is necessary to make the lens angle φ at the base of the lens sixty degrees or more in order to obtain a wide viewing angle with an emergent angle θ of 40 degrees or more.

However, in such an incident-side single lenticular lens sheet 60, when the lens angle φ at the base of the lens is made large, extraneous light D which has entered from the light-emerging surface 64 side is totally reflected at the lens, and emerges again from the light-emerging surface 64 as shown in FIG. 3B, and this light is observed (see symbols D1, D2, D3 and D4). For this reason, the image contrast is drastically decreased.

It is noted that, in the case of a conventional lenticular lens sheet with black stripes, the light-emerging surface is formed in the vicinity of the focal point (condensing point) of each lens in the lens area and that the distance between the lens area formed on the light-entering surface and the light-emerging surface is equal to "h+L". In the above Table 1, the distance "h+L" is 1.41 when the lens angle φ is 60 degrees, and 1.25 when φ is 70 degrees. It can thus be understood that it is necessary to make the distance between the lens area formed on the tight-entering surface and the light-emerging surface approximately 1.3 times the lens pitch. For this reason, in the case of the conventional lenticular lens sheet with black stripes, when the lens pitch is made small, the lenticular lens sheet becomes thin, so that such problems that the rigidity of the lens sheet is decreased and that it becomes difficult to mold such a lens sheet are brought about as contrasted in the case of the incident-side single lenticular lens sheet in which it is not always necessary to make the distance between the lens area and the light-emerging surface "h+L".

SUMMARY OF THE INVENTION

The present invention was accomplished by taking the aforementioned problems in the prior art into consideration. An object of the present invention is therefore to provide a lenticular lens sheet that can prevent the reflection of extraneous light without lowering the intensity of imaging light so much to obtain enhanced contrast and in which the lenticular lens pitch can be made extremely small, and a process for producing such a lenticular lens sheet.

A first aspect of the present invention is a lenticular lens sheet comprising a base member in the form of a film or sheet; and a lens area including a plurality of lenticular lenses convexly formed on a light-entering surface of the base member, wherein a non-colored layer is formed in the base member, or each lenticular lens of the lens area on the base side thereof, and a colored layer is formed in each lenticular lens of the lens area at least at the apex thereof.

In the first aspect of the present invention, it is preferable that the lenticular lens sheet further comprises a substantially transparent front sheet provided on the light-emerging surface side of the base member, and a surface-treatment layer provided on the light-emerging surface side of the base member or on the front surface of the front sheet. It is preferable that at least one layer selected from an antireflection layer, an antistatic layer, a scratch resistant layer, a polarized light filter layer, an antistaining layer, a magnetic-wave-shielding layer, an antiglaring layer and a layer functioning as a touch sensor be included in the surface-treatment layer. Further, it is preferable that the lens area be formed by using an ionizing-radiation-curable resin.

A second aspect of the present invention is a process for producing a lenticular lens sheet, comprising the steps of coating a non-colored ionizing-radiation-curable resin onto one surface of a base member in the form of a film or sheet; coating a colored ionizing-radiation-curable resin onto a lens-shaping mold on which a lenticular lens pattern has been formed; nipping the base member against the lens-shaping mold with the non-colored resin and the colored resin facing each other; and curing the non-colored resin and the colored resin by applying thereto ionizing radiation.

In the second aspect of the present invention, it is preferable that the process further comprises the step of drying the non-colored resin coated onto the base member and that the fluidity of the non-colored resin coated onto the base member be lower than that of the colored resin at the time when the lens is shaped. Moreover, it is preferable that the process further comprises the step of integrating the base member and a substantially transparent front sheet by means of coating and/or lamination, and the step of forming a surface-treatment layer on the light-emerging surface of the base member or on the front surface of the front sheet by means of coating and/or lamination. It is preferable that the base member be fed as a continuous film or sheet.

According to the first and second aspects of the present invention, enhanced contrast can be obtained by preventing the reflection of extraneous light without lowering the intensity of imaging light so much, and a lenticular lens sheet in which lenticular lens pitch is extremely small can be obtained.

DETAILED DESCRIPTION OF THE INVENTION

By referring to the accompanying drawings, embodiments of the present invention will now be described in detail.

Figure 1A:
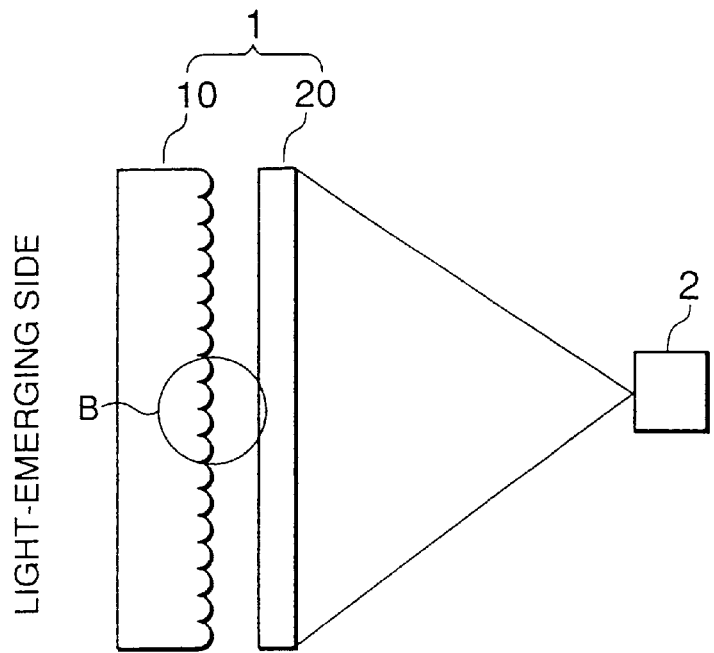
FIGS. 1A and 1B are views showing a first embodiment of a lenticular lens sheet according to the present invention, and a rear projection screen using the same.
Figure 1B:
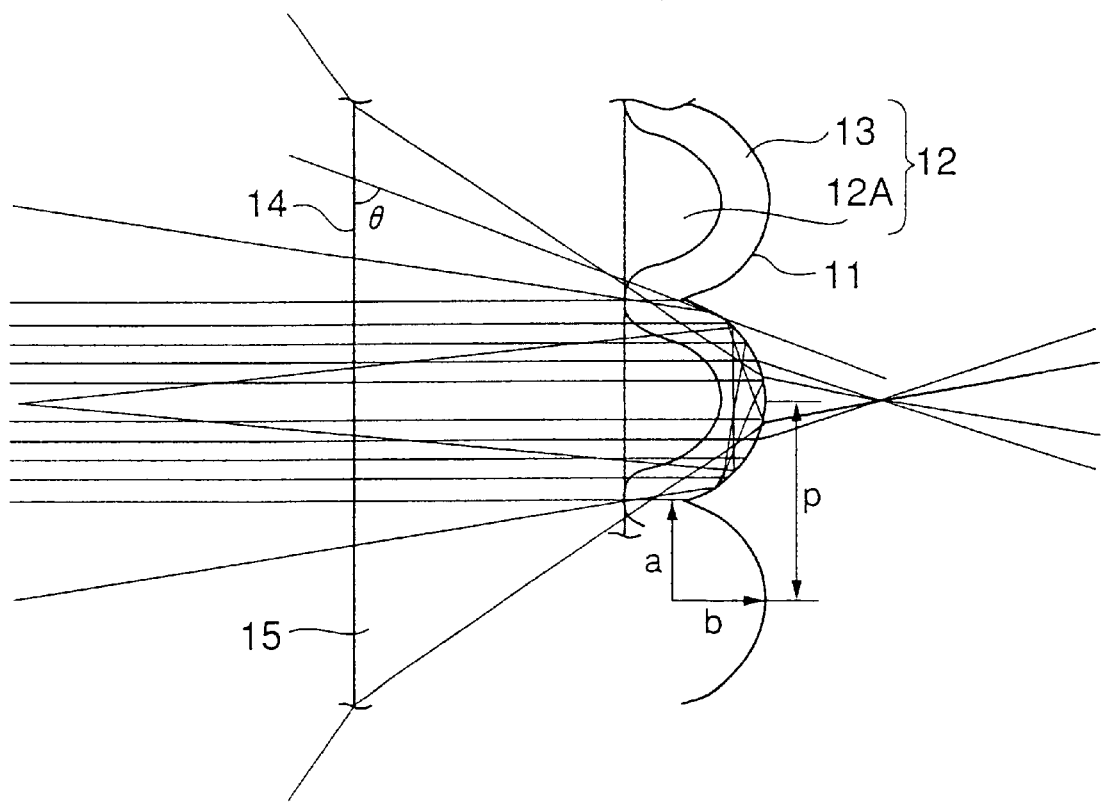
Figure 2:
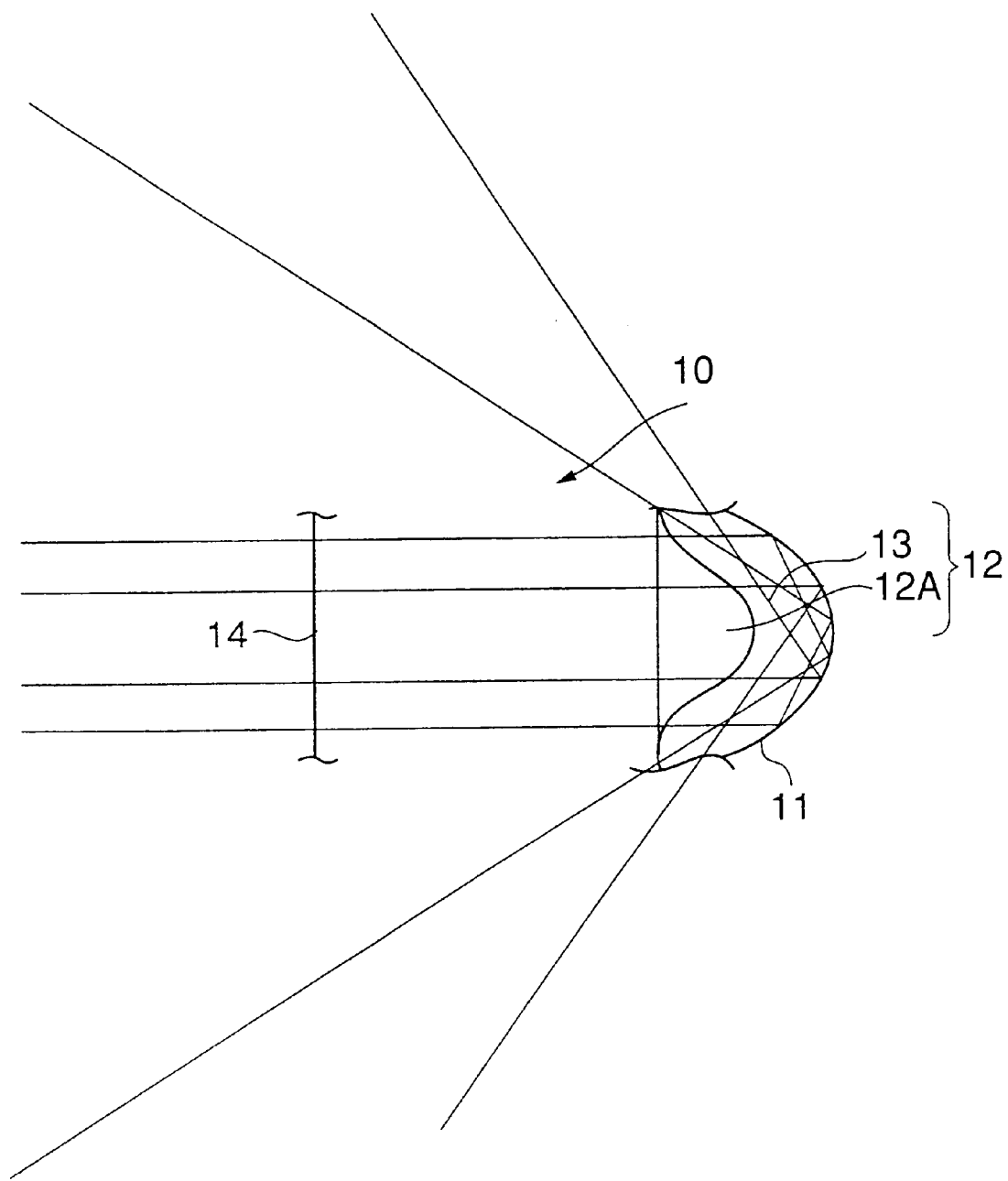
FIG. 2 is a view for illustrating the reflection of extraneous light in the lenticular lens sheet according to the first embodiment of the present invention.

FIG. 1A is a view showing a rear projection screen in which a lenticular lens sheet according to the first embodiment of the present invention is used; and FIG. 1B is an enlarged view of the part B in FIG. 1A, showing the lenticular lens sheet according to the first embodiment of the present invention. FIG. 2 is a view for illustrating the reflection of extraneous light in the lenticular lens sheet shown in FIGS. 1A and 1B.

As shown in FIG. 1A, a lenticular lens sheet 10 according to this embodiment constitutes a rear projection screen 1 together with a Fresnel lens sheet 20. Further, this rear projection screen 1 constitutes a rear projection system together with a light source 2 such as an LCD projector.

As shown in FIG. 1B, the lenticular lens sheet includes a base member 15 in the form of a film or sheet, and a lens area 12 including lenticular lenses convexly formed on the light-entering surface 11 side of the base member 15.

The lens area 12 is formed by using an ionizing-radiation-curable resin such as an ultraviolet-light- or electron-beam-curable resin. A non-colored layer 12A which is substantially transparent and non-colored is formed in each lenticular lens on the base side thereof; and a colored layer 13 is formed in each lenticular lens along the light-entering surface 11 thereof. It is noted that the colored layer 13 has the function of enhancing the contrast of the incident-side single lenticular lens sheet 10.

Figure 3A:
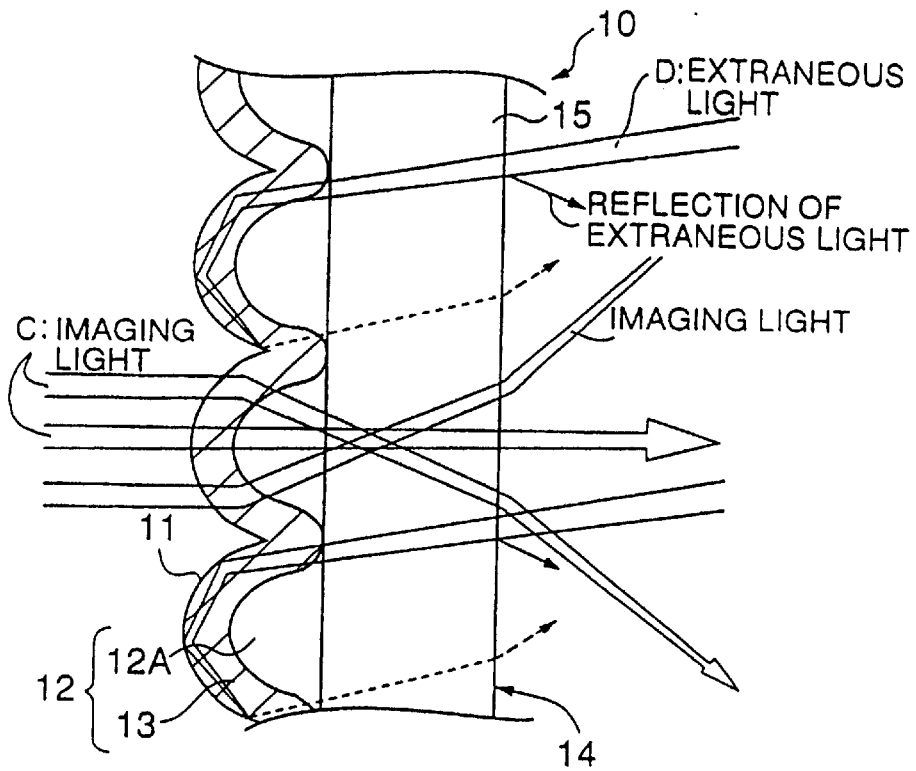
FIGS. 3A and 3B are views for illustrating the function of the colored layer in the lenticular lens sheet according to the first embodiment of the present invention by comparison with a conventional incident-side single lenticular lens sheet.
Figure 3B:
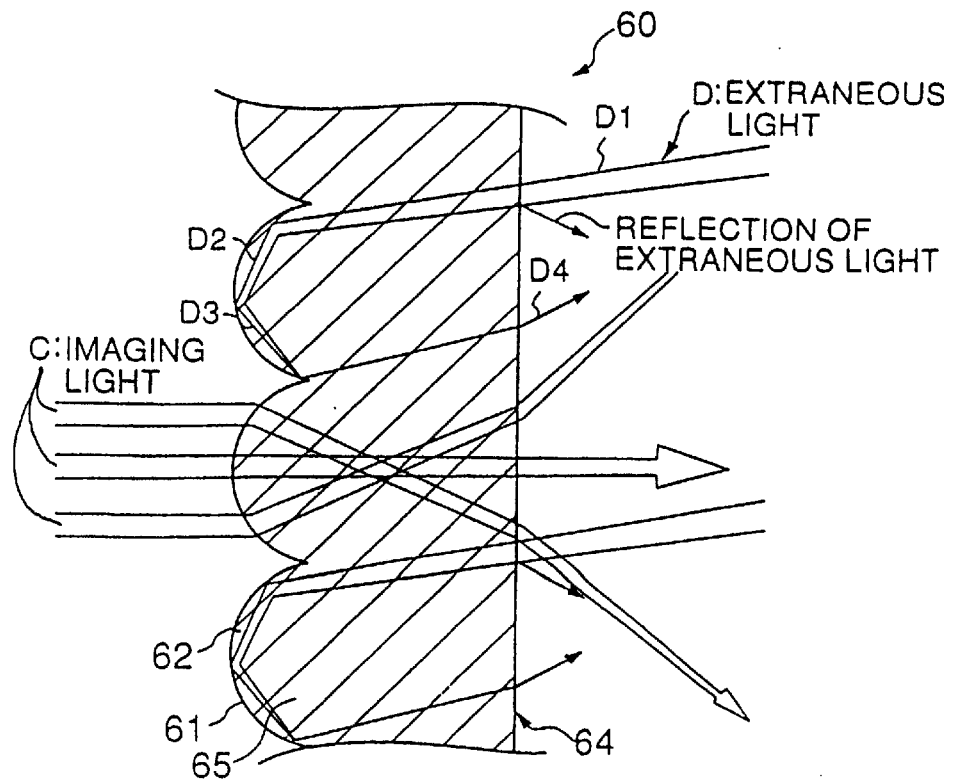

FIGS. 3A and 3B are views for illustrating the function of the colored layer in the lenticular lens sheet 10 according to this embodiment by comparison with a conventional incident-side single lenticular lens sheet 60.

As shown in FIG. 3B, the conventional lenticular lens sheet 60 is an incident-side single lenticular lens sheet of body colored type in which a base layer 65 is colored entirely. In the lenticular lens sheet 60 shown in FIG. 3B, extraneous light D (D1) which has entered from the observation side is totally reflected at a lens area 62 formed on the light-entering surface 61 of the lenticular lens sheet 60, and emerges again toward the observation side as extraneous light D4. In this process, the extraneous light D1 is repeatedly reflected along, the outline of the lenticular lens in the lens area 62 (D1→D2→D3→D4).

On the other hand, in the lenticular lens sheet 10 according to this embodiment, the colored layer 13 is formed along the optical path of light which is totally reflected along the outline of the lenticular lens in the lens area as shown in FIG. 3A. Therefore, the optical path length of extraneous light D in the colored layer 13 is approximately 5 to 10 times the optical path length of imaging light A in the colored layer 13. It is noted that, in the case of the conventional lenticular lens sheet 60 of body-colored type shown in FIG. 3B, the optical path length of extraneous light D in the colored layer (base layer 65) is only about 2 to 3 times the optical path length of imaging light A in the colored layer (base layer 65).

For this reason, according to the lenticular lens sheet 10 of this embodiment, it is possible to prevent the reflection of extraneous light D without lowering the intensity of imaging light A so much. It is thus possible to obtain a screen excellent in contrast.

The lenticular lens sheet 10 according to this embodiment is characterized by efficiently absorbing extraneous light D which is totally reflected at each lens in the lens area 12 formed on the light-entering surface 11. Therefore, in order to allow each lens in the lens area 12 to totally reflect the extraneous light D, each lens in the lens area 12 is required to have a portion whose inclination is such that the angle φ formed with the screen surface (see FIG. 4) is at least equal to the critical angle (approximately 42 degrees). A lenticular lens sheet including a lens area 12 having a portion whose inclination is smaller than the above-described value cannot be superior to the lenticular lens sheet 60 of body colored type.

Figure 4:
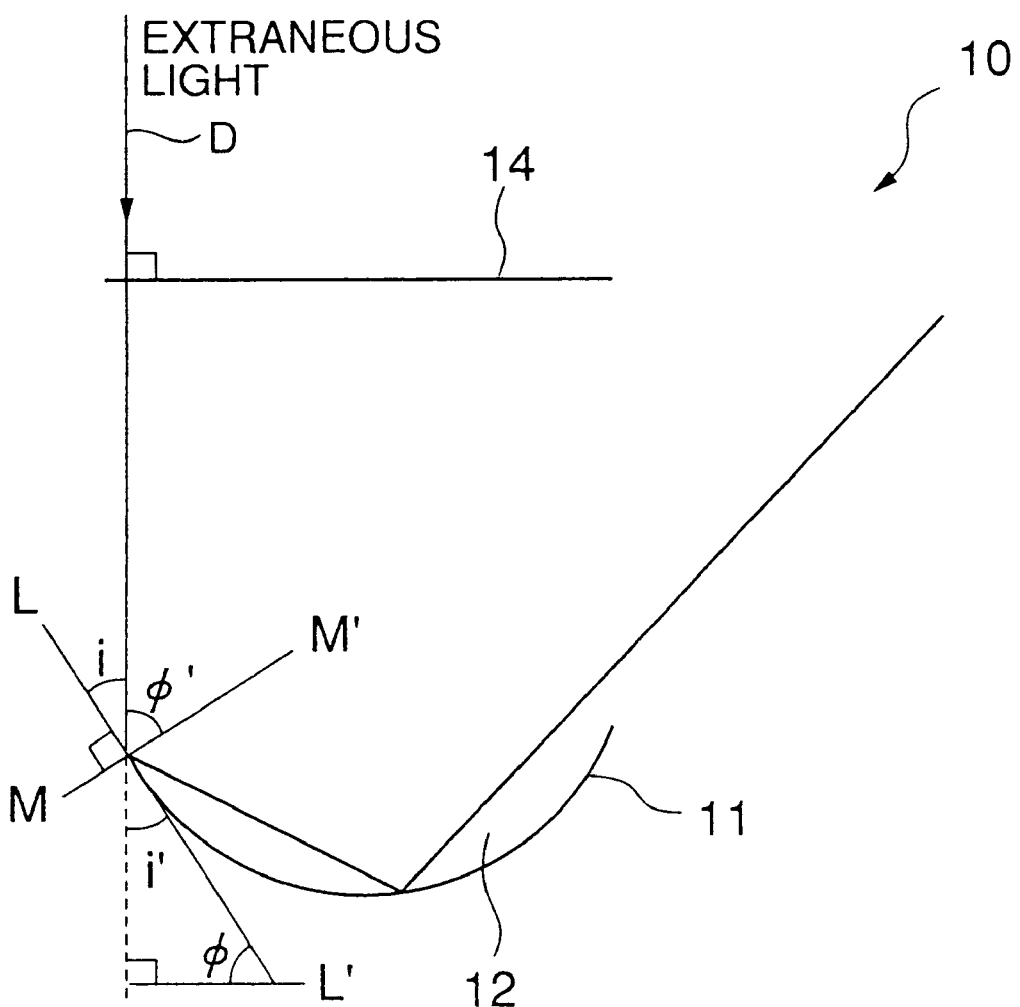
FIG. 4 is a view for illustrating the relationship between the angle of the lens area in the lenticular lens sheet formed with a screen surface, and the incident angle of extraneous light.

FIG. 4 is a view for illustrating the relationship between the angle of the lens area in the lenticular lens sheet formed with the screen surface, and the incident angle of extraneous light. As shown in FIG. 4, the incident angle φ' at the time when extraneous light which has vertically entered into the lenticular lens sheet emerges from or is totally reflected at the lens area 12, is equal to the lens angle φ formed with screen surface at this site. Namely, in FIG. 4, the line L–L' (tangent) and the line M–M' (normal) intersect at a right angle, and i=i', so that φ is equal to φ'.

For this reason, in order to allow each lens in the lens area 12 to totally reflect the extraneous light D, each lens in the lens area 12 is required to have a portion at which the lens angle φ is equal to or more than the critical angle $\sin^{-1}(1/n)$ (wherein n represents the refractive index of the lenticular lens sheet).

However, as shown in the above Table 1, when the inclination is approximately 42 degrees, only a narrow diffusion angle of approximately 25 degrees can be obtained. It is, therefore, generally desirable that each lens in the lens area 12 has a portion at which the lens angle is approximately 60 degrees or more so that the diffusion angle will be 40 degrees or more.

The coloring method for obtaining the above-described colored layer 13, and the color, color density, shape and thickness of the colored layer 13 will be described in detail hereinafter.

The Coloring Method for Obtaining Colored Layer)

It is preferable that coloring for obtaining the colored layer 13 be effected by incorporating or dispersing a dye or pigment in a molding resin of ionizing radiation curable type.

(Color of Colored Layer)

As the color of the colored layer 13, it is preferable to use an achromatic color such as gray, or a color capable of selectively absorbing or transmitting light of a specific color to control the balance of three primary colors (red, green and blue) in the spectral properties of the light source.

(Color Density of Colored Layer)

It is preferable that the color density of the colored layer 13 be made higher than those of the layers positioned on the light-emerging surface 14 side in terms of the colored layer 13 (the non-colored layer 12A and the base member 15) and that the color density of the non-colored layer 12A and that of the base member 15 be made either 0 or low, thereby reducing the effect of extraneous light without lowering so much the transmittance of projection light (imaging light) emitted by the light source 2.

Specifically, it is preferable that the color density of the colored layer 13 be so made that the transmittance of the lenticular lens sheet 10 will be from 40 to 70%. When the color density is made low so that the transmittance will be higher than 70%, although the transmittance is increased, the intensity of extraneous light which is totally reflected at the lens area 12 and returned to the observation side is increased; the contrast is thus lowered. On the contrary, when the color density is made high so that the transmittance will be lower than 40%, the transmittance of imaging light is merely decreased, and the reflection of extraneous light at the light-emerging surface 14 becomes relatively outstanding. The contrast is thus lowered also in this case.

Figure 5:
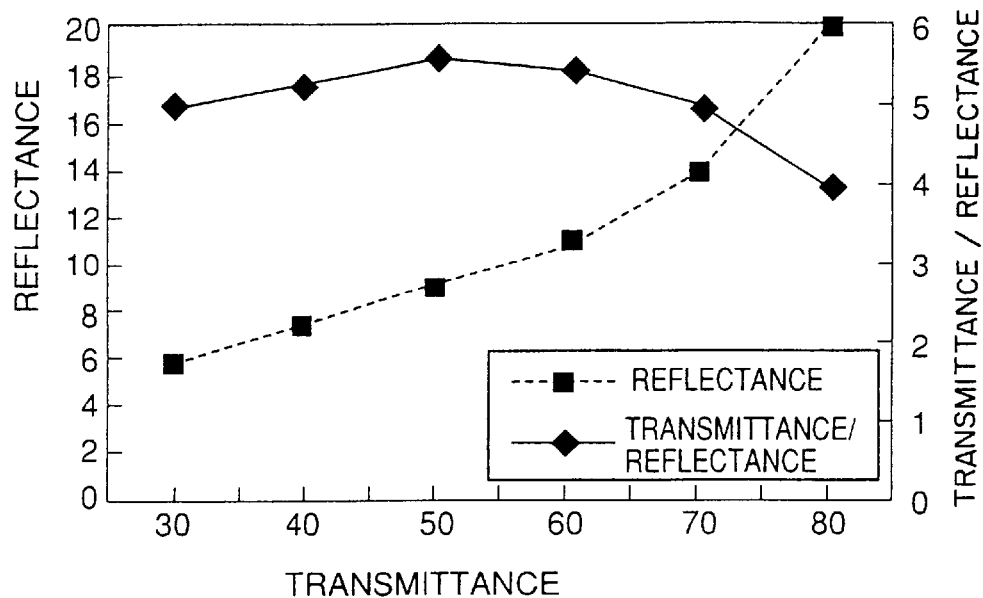
FIG. 5 is a graph showing the relationship between the transmittance of the lenticular lens sheet according to the first embodiment of the present invention, and contrast.

FIG. 5 is a view showing the relationship between the transmittance of the lenticular lens sheet according to this embodiment, and contrast. Lenticular lens sheets 10 including colored layers with different color densities were prepared, and the transmittance and reflectance of each of these lenticular lens sheets were respectively measured by a spectrophotometer ("UV 2100" manufactured by Shimadzu Corp., Japan). The reflectance and transmittance/reflectance ratio were plotted against transmittance (abscissa). The reflectance can be read from the ordinate on the left-hand side; and the transmittance/reflectance ratio can be read from the ordinate on the right-hand side.

The transmittance is increased when the color density is decreased, and the reflectance is drastically increased at around the point at which the transmittance exceeds 70% as shown in FIG. 5. This is because it becomes difficult for the colored layer 13 to sufficiently absorb extraneous light when the color density of the colored layer 13 is decreased. The lenticular lens sheet 10 according to this embodiment does not absorb extraneous light reflected at the light-emerging surface 14 on the observation side. Therefore, also in the case where the transmittance is decreased by increasing the color density, the transmittance/reflectance ratio is decreased, and a peak is observed when the transmittance is 50%.

For this reason, it is preferable as mentioned above that the color density of the colored layer 13 be made so that the transmittance of the lenticular lens sheet 10 will be from 40 to 70%.

In the case where a transmission-type LCD light source is used as the light source 2, the output of the LCD light source is not so great, and there is also a limitation to sacrifice the transmittance. Therefore, it is more preferable that the color density of the colored layer 13 be so made that the transmittance will be from 45 to 60%.

(Shape of Colored Layer)

Figure 6:
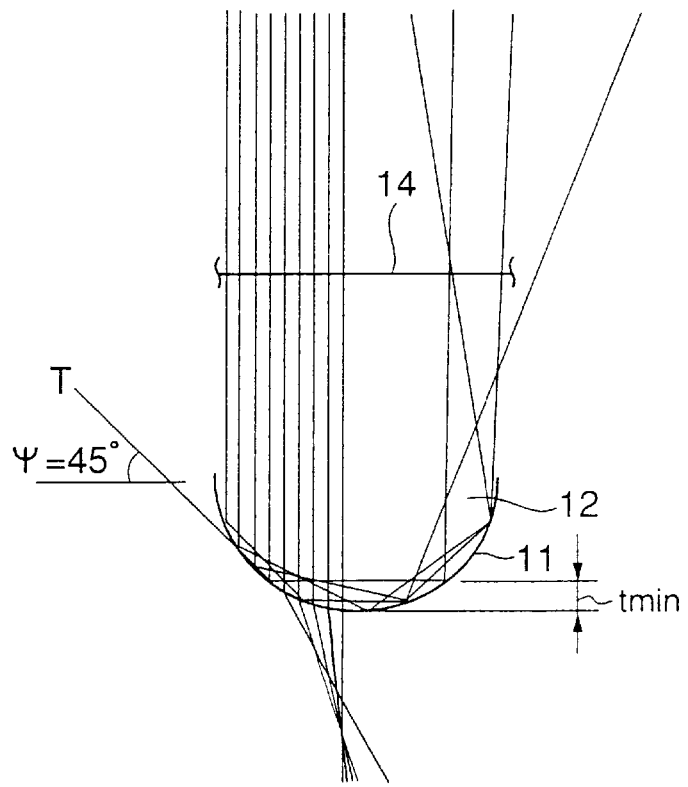
FIG. 6 is a view for illustrating the optimum thickness of the colored layer in the lenticular lens sheet according to the first embodiment of the present invention.

FIG. 6 is a view for illustrating the optimum thickness of the colored layer in the lenticular lens sheet according to this embodiment.

As mentioned previously, the lenticular lens sheet 10 according to this embodiment utilizes such a phenomenon that extraneous light which has entered into the light-emerging surface 14 on the observation side travels along the lens area 12. It is therefore preferable to make the colored layer 13 follow the outline of the lens area 12.

In this case, the minimum geometrical optical thickness $t_{min}$ of the colored layer 13 is equal to the height of the lens at the position at which the inclination $\phi$ of the tangent T to the lens area 12 is 45 degrees. When the shape of the cross section of the lens is an ellipse, this thickness can be calculated from the following equation (1):

$$t_{min}=b-b^2(a^2+b^2)^{1/2} \quad (1)$$

wherein a and b are the transverse diameter (minor axis) and longitudinal diameter (major axis) of the ellipse, respectively (see FIG. 1B). It is noted that, when the thickness of the colored layer 13 is made equal to the value of $t_{min}$ calculated from the above equation (1), the best contrast can be obtained.

In the case of an elliptical lenticular lens whose cone constant k is approximately 0.45 ($=a^2/b^2-1$) and whose lens angle at the base of the lens is approximately 60 degrees, the above-described $t_{min}$ is approximately 1/10 of the lens pitch.

On the other hand, even in the case where the colored layer 13 does not follow the outline of the lens area 12, for instance, even when the lens area 12 in whole is made as the colored layer 13 while the base member 15 is made as the non-colored layer 12A, or even when the boundary face between the colored layer 13 and the non-colored layer 12A is flat, a lenticular lens sheet 10 which is superior to the lenticular lens sheet 60 of body-colored type can be obtained as can be expected from the comparison shown in FIGS. 3A and 3B.

In the case where the lens area 12 in whole is made as the colored layer 13, the colored layer 13 is made thinner as much as possible. It is therefore preferable to make the thickness of the colored layer 13 equal to or smaller than the lenticular lens pitch, or not greater than ½ of the thickness of the lenticular lens sheet.

(Distribution of Thickness of Colored Layer)

Figure 7:
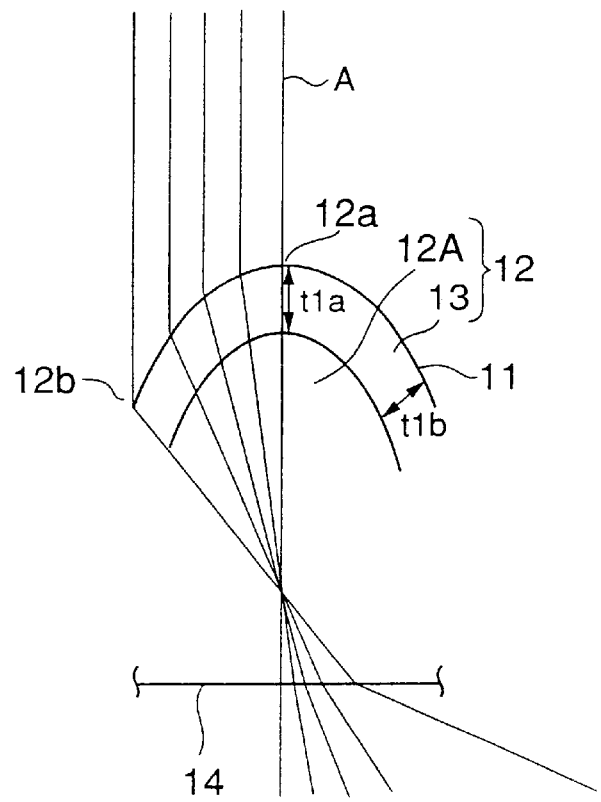
FIG. 7 is a view for illustrating the optimum distribution of the thickness of the colored layer in the lenticular lens sheet according to the first embodiment of the present invention.

FIG. 7 is a view for illustrating the optimum distribution of the thickness of the colored layer in the lenticular lens sheet according to this embodiment.

In one lens in the lens area 12, it is preferable that the colored layer 13 be so made that the thickness t1b at the base 12b of the lens will be smaller than the thickness t1a at the apex 12a of the lens ($t_{1a} > t_{1b}$). This is because, when the thickness of the colored layer 13 is made uniform, the optical path length in the colored layer 13 of imaging light which has entered into the base 12b of the lens becomes longer than that of imaging light which has entered into the apex 12a of the lens area 12, so that the former imaging light is absorbed greatly by the colored layer 13 as compared with the latter imaging light. As a result, the intensity of light which emerges at a diffusion angle of 30 to 40 degrees is decreased (see FIG. 8).

Figure 8:
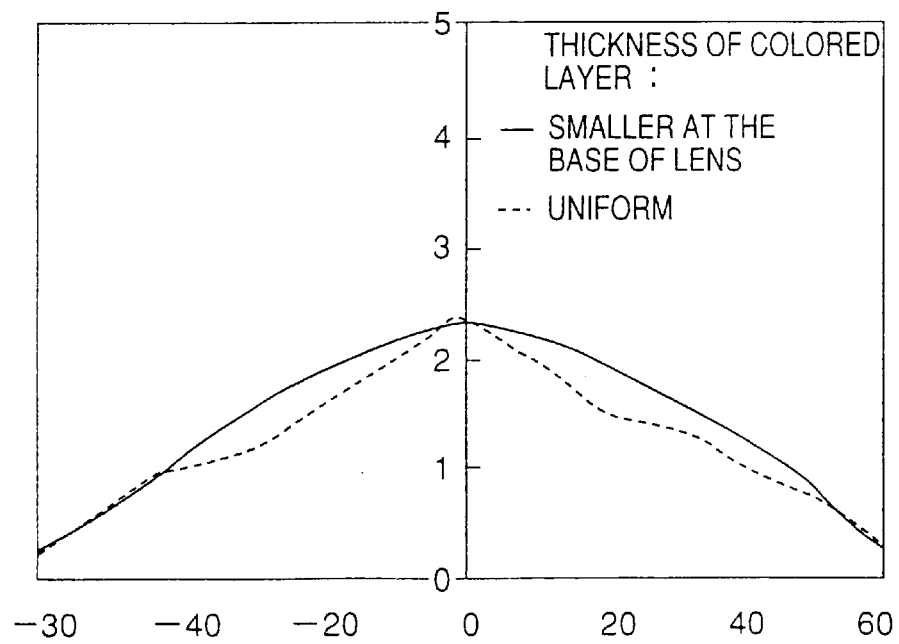
FIG. 8 is a graph showing the light-diffusing property of the lenticular lens sheet according to the first embodiment of the present invention, by comparing a case where the thickness of the colored layer is made uniform with a case where the thickness of the colored layer at the base of the lens is made smaller.

FIG. 8 is a graph showing the light-diffusing property of the lenticular lens sheet according to this embodiment, by comparing a case where the thickness of the colored layer is made uniform with a case where the thickness of the colored layer at the base of the lens is made small.

As shown in FIG. 8, in the lenticular lens sheet 10 according to this embodiment, the above-described phenomenon (decrease in the intensity of light emerging at a diffusion angle of 30 to 40 degrees) can be prevented by making thickness of the colored layer 13 at the base 12b of the lens small.

It is preferable to vary the thickness of the colored layer 13 depending upon the optical path length of incident light. By doing so, it is possible to obtain the desired light-diffusing property corresponding to lens design. Further, it is also possible to diffuse incident light without incorporating any diffusing agent into the colored layer 13, but (1) by forming a diffusing agent layer in the non-colored layer 12A, or (2) by forming a matte layer on the light source side in terms of the lenticular lens sheet by the use of a metal mold having a matte surface or by making the surface of the molded lens matted.

It is noted that the light-emerging surface 14 of the lenticular lens sheet 10 according to this embodiment is smooth or matted.

In the case where the light-emerging surface 14 is made smooth, clearness can be given to the image projected. In this case, it is not necessary to place a transparent flat panel in front of the screen, so that the screen is free from unfavorable reflection from the light-entering surface (back surface) of the flat panel. Consequently, a favorable image can be obtained. Further, when the light-emerging surface 14 is made smooth, an antireflection layer, a low-reflection layer, a polarized light filter layer or the like can be provided as the surface-treatment layer. In this case, contrast comparable to contrast obtainable by the conventional lenticular lens sheet with black stripes can be obtained. Furthermore, it is also possible to form, on the light-emerging surface 14, an antistatic layer, a scratch resistant layer (hard coat layer), an antiglaring layer, an antistaining layer, a magnetic-wave-shielding layer, or a layer functioning as a touch sensor.

On the contrary, when the light-emerging surface 14 is matted, it becomes antiglaring. Therefore, to matting the light-emerging surface 14 is useful for protecting the screen surface from unfavorable reflection.

Thus, the light-emerging surface 14 of the lenticular lens sheet 10 according to this embodiment is flat, so that it is possible to form thereon a variety of surface-treatment layers (function layers). Further, by laminating a substantially transparent sheet to the lenticular lens sheet 10 in order to make the lens sheet rigid, a front panel which is usually used for a screen including the conventional lenticular lens sheet with black stripes can be omitted.

In the lenticular lens sheet 10 according to this embodiment, an optical axis correcting lens is not formed on the light-emerging surface 14. It is therefore preferable to use, as the light source 2, a projector of single lens or tube type which projects imaging light from one lens. Further, as the light source 2, it is preferable to use an LCD or DMD projector or the like in which light from a lamp is split into spectra of three primary colors by a dichromic mirror, image information is given by transmitting the spectra through an LCD, and the spectra are then combined again and projected.

Second Embodiment

By referring now to FIG. 9, a second embodiment of the lenticular lens sheet according to the present invention will be described. The second embodiment of the present invention is almost the same as the first embodiment shown in FIGS. 1A and 1B except that a front sheet and a surface-treatment layer are provided on the light-emerging surface side of a base member. In the second embodiment of the present invention, the same parts as in the first embodiment shown in FIGS. 1A and 1B are represented by the same symbols, and detailed explanations for these parts are omitted.

Figure 9:
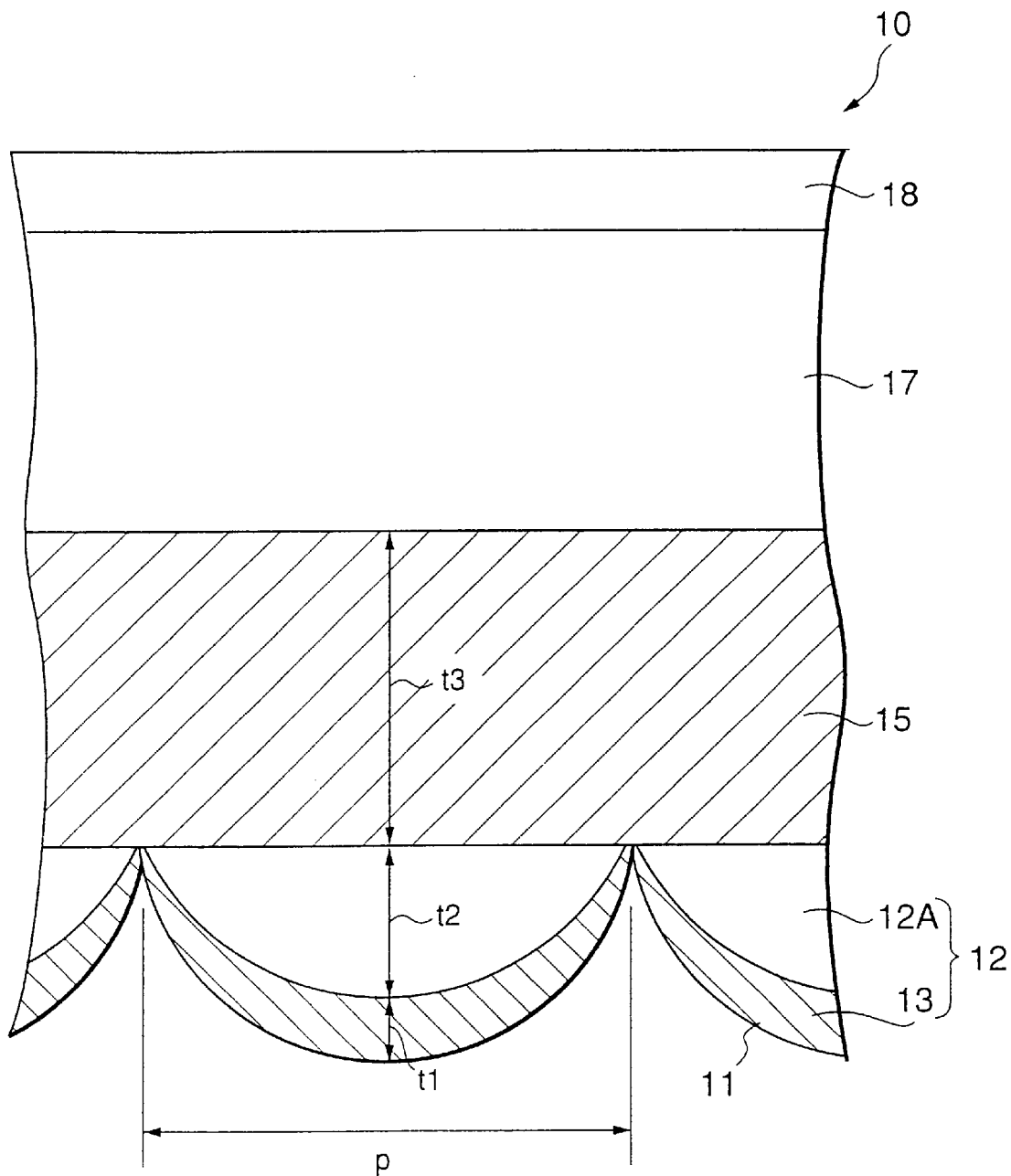
FIG. 9 is a view showing a second embodiment of the lenticular lens sheet according to the present invention.

As shown in FIG. 9, in a lenticular lens sheet 10 according to this embodiment, a substantially transparent and non-colored front sheet 17 is provided on the light-emerging surface of a base member 15. The front sheet 17 is useful for increasing the rigidity of the lenticular lens sheet 10. A resin sheet such as an acrylic resin, polycarbonate, styrene or polyolefin resin sheet can desirably be used as the front sheet 17.

Further, a surface-treatment layer 18 is provided on the front surface of the front sheet 17. As the surface-treatment layer 18, it is preferable to form at least one of the following layers: an antireflection layer, an antistatic layer, a scratch resistant layer (hard coat layer), a polarized light filter layer, an antistaining layer, a magnetic-wave-shielding layer, an antiglaring layer, and a layer functioning as a touch sensor.

It is also possible to directly form the surface-treatment layer 18 on the front surface of the base member 15 without providing the front sheet 17 as described above.

Process for Producing Lenticular Lens Sheet

A process for producing a lenticular lens sheet according to the above-described first or second embodiment of the present invention will be described hereinafter.

Figure 10:
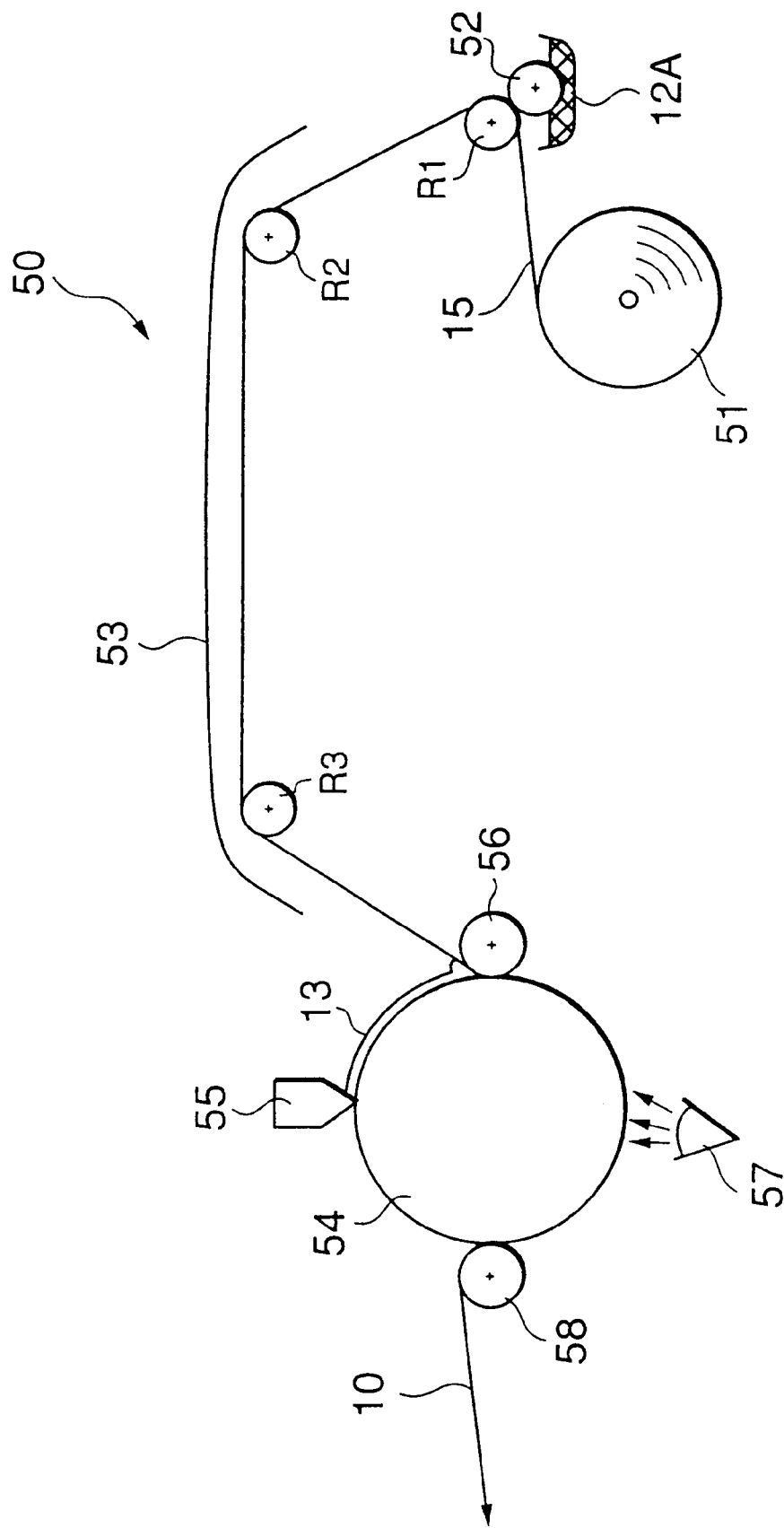
FIG. 10 is a view for showing one example of a production system for producing a lenticular lens sheet according to the first or second embodiment of the present invention.

An example of a system for producing a lenticular lens sheet is shown in FIG. 10.

As shown in FIG. 10, a production system 50 is composed of a roll 51 around which a base member 15 in the form of a continuous film is wound, a coater 52 for coating a non-colored ultraviolet-light-curable resin 12A which is substantially transparent and non-colored and which has been diluted with a solvent onto one surface (light-entering surface) of the base member 15, a dryer 53 for drying the non-colored resin 12A coated onto the base member 15, a metal mold roll (lens-shaping mold) 54 on which a lenticular lens pattern has been formed, a dispenser 55 for coating a colored ultraviolet-light-curable resin 13 onto the metal mold roll 54, a nip roll 56 for nipping the base member 15 against the metal mold roll 54 with the colored resin 13 and the non-colored resin 12A facing each other, a UV lamp 57 for applying ultraviolet light to the colored resin 13 and the non-colored resin 12A on the metal mold roll 54, and a release roll 58 for releasing the shaped lenticular lens sheet from the metal mold roll 54.

Next, a process for producing a lenticular lens sheet according to the first or second embodiment of the present invention, by using the production system shown in FIG. 10 will be described.

Figure 11:
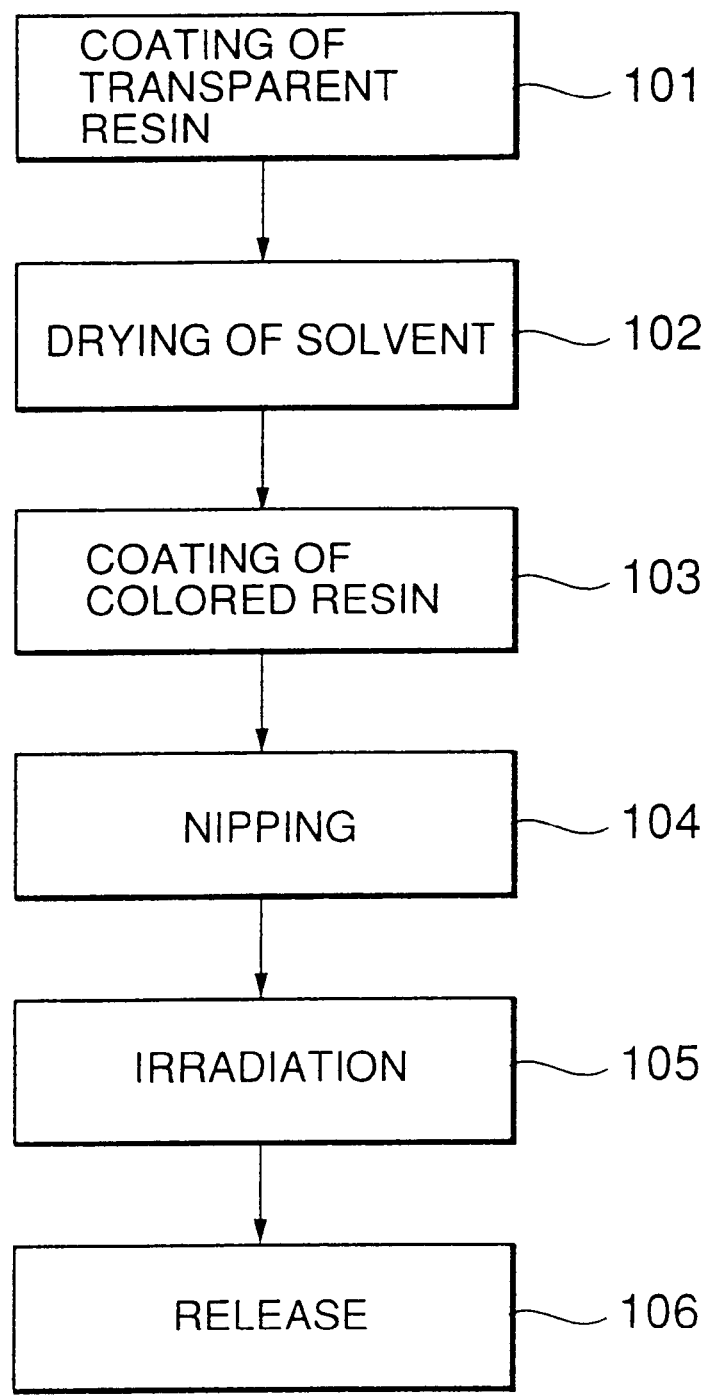
FIG. 11 is a flow sheet for illustrating a process for producing a lenticular lens sheet according to the first embodiment of the present invention.

FIG. 11 is a flow sheet for illustrating one example of a process for producing a lenticular lens sheet according to the first embodiment of the present invention.

At first, a highly-viscous non-colored resin 12A is diluted with a solvent, and the diluted resin solution is coated onto one surface of a base member 15 in the form of a film by the coater 52 (step 101). Subsequently, the coated resin is dried by the dryer 53 using hot air to form a non-colored resin layer having restrained fluidity (step 102). It is noted that this step 102 can be omitted depending upon the production conditions to be employed.

Next, a colored ultraviolet-light-curable resin 13 is coated onto the metal mold roll 54 (step 103), and the base member on which the non-colored resin 12A has been coated is then nipped against the metal mold roll 54 on which the colored resin 13 has been coated so that the colored resin 13 and the non-colored resin 12A can be laminated to each other (step 104).

Thereafter, ultraviolet light is applied by the UV lamp 57 from the base member 15 side to cure the colored resin 13 and the non-colored resin 12A (step 105).

Finally, a lenticular lens sheet 10 in which a lens area 12 composed of the colored resin 13 and the non-colored resin 12A has been formed on the base member 15 is released from the metal mold roll 54 (step 106).

In this production process, a urethane acrylate or epoxy acrylate resin can be used as the ionizing-radiation-curable resin. The colored resin 13 can be obtained by mixing a dye or pigment, or a colored UV ink with the above-described resin.

It is preferable that the fluidity of the non-colored resin 12A be lower than that of the colored resin 13 at the time when a lens is shaped. This is effective to obtain a two-layer structure without bringing about unfavorable mixing of the pre coat resin (non-colored resin 12A) with the colored resin 13 during the step of nipping. To attain this, a polymer may be added to the non-colored resin 12A; or the molecular weight of an oligomer or polymer may be increased.

Figure 12:
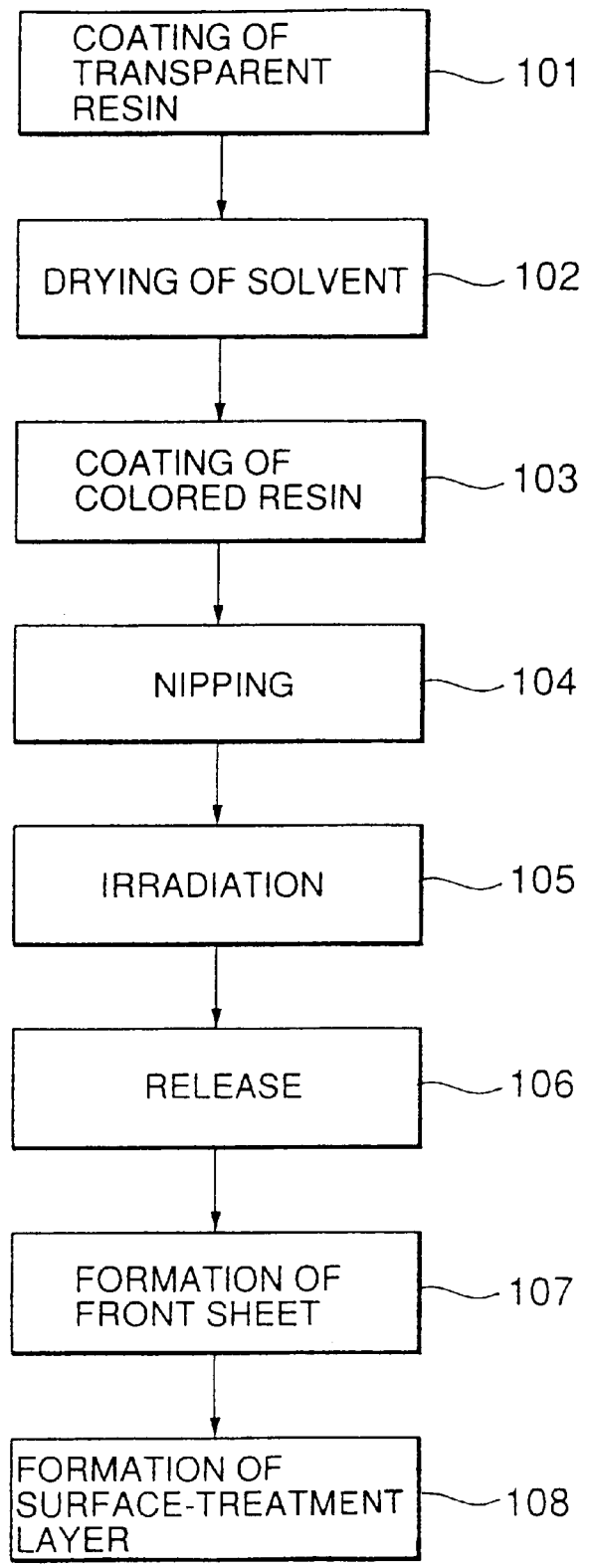
FIG. 12 is a flow sheet for illustrating a process for producing a lenticular lens sheet according to the second embodiment of the present invention.
Figure 13:
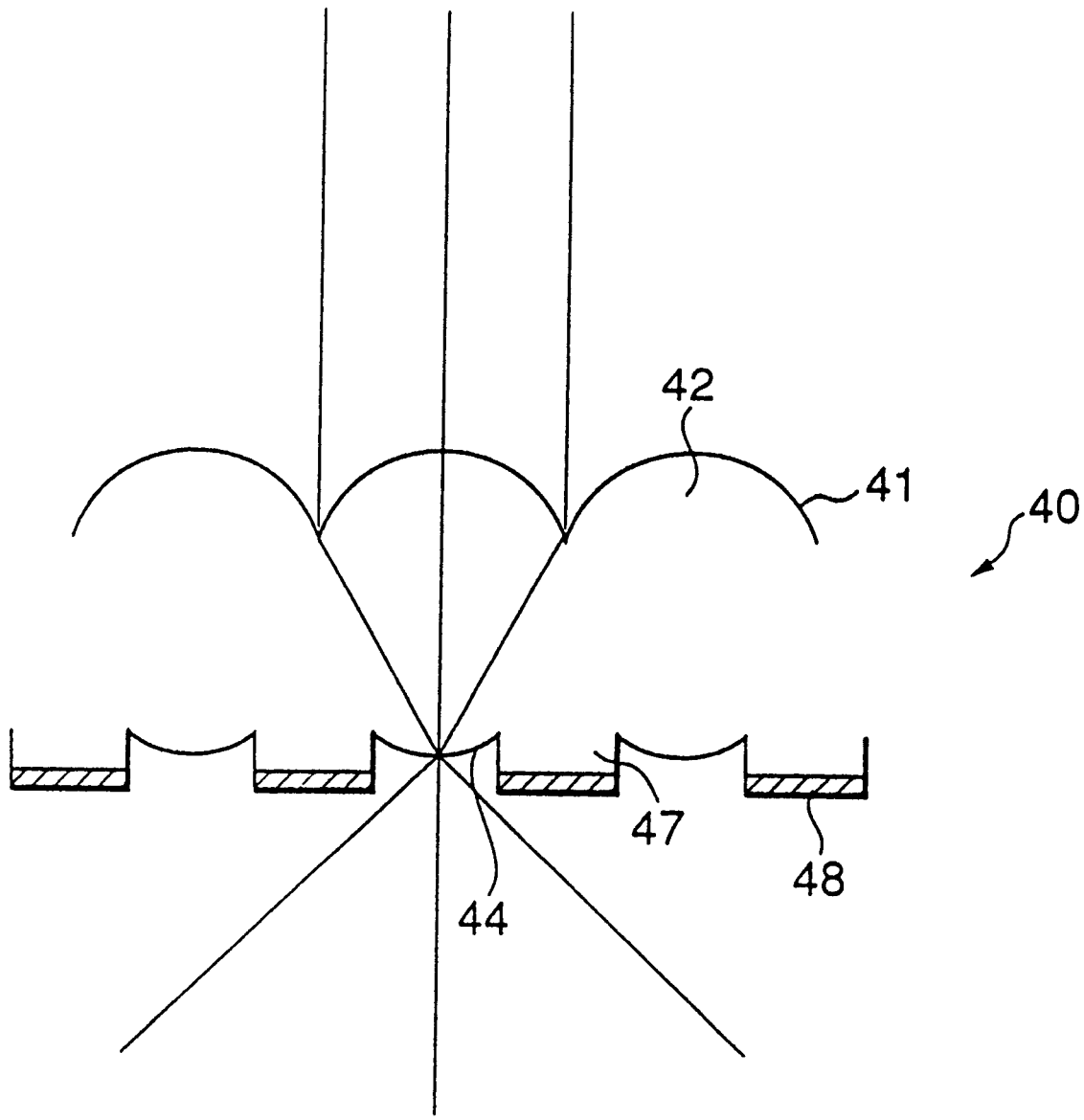
FIG. 13 is a view showing a conventional lenticular lens sheet with black stripes.
Figure 14:
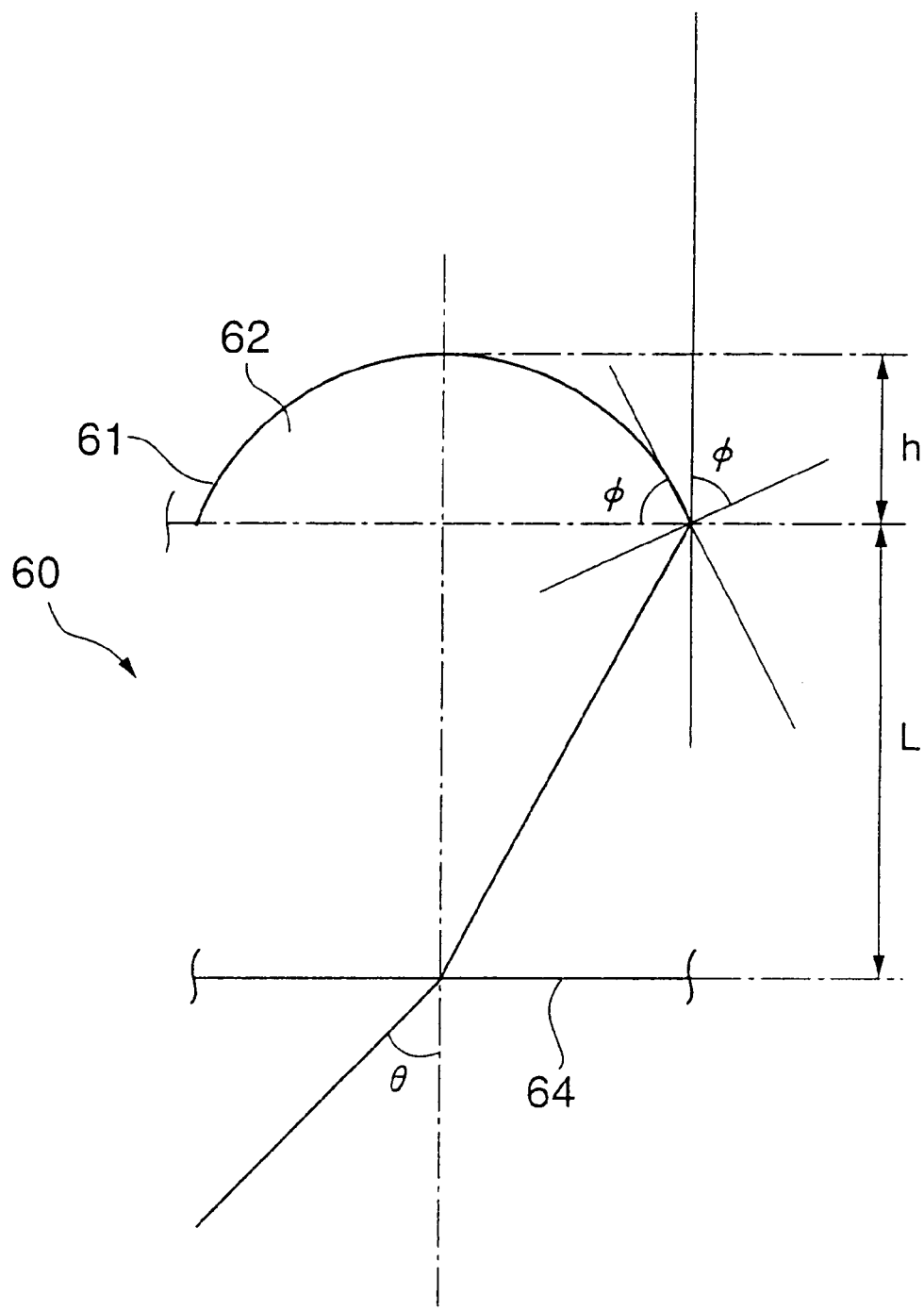
FIG. 14 is a view for illustrating the relationship between the inclination of a lens at the point at which light enters into an incident-side single lenticular lens sheet, and the emergent angle of this light.

FIG. 12 is a flow sheet for illustrating one example of a process for producing a lenticular lens sheet according to the second embodiment of the present invention. The steps 101 to 106 shown in FIG. 12 are identical with the steps 101 to 106 shown in 11.

To provide a front sheet on the lenticular lens sheet 10, the step of forming a substantially transparent, and non-colored front sheet 17 on the base member 15 by means of coating or lamination (step 107) is added, as shown in FIG. 12, to the process shown in FIG. 11.

Further, to provide a surface-treatment layer 18, the step of forming a surface-treatment layer 18 which is at least one of an antireflection layer, an antistatic layer, a scratch resistant layer, a polarized light filter layer, an antistaining layer, a magnetic-wave-shielding layer, an antiglaring layer, and a layer functioning as a touch sensor on the base member 15 or on the front surface of the front sheet 17 by means of coating and/or lamination (step 108) is added to the process shown in FIG. 11.

It is noted that the step of forming a front sheet 17 onto the base member 15 (step 107) may be conducted after the surface-treatment layer 18 is formed onto the front sheet 17 (step 108).

According to this production process, since a lenticular lens sheet is formed by the use of an ultraviolet-light-curable resin, it is possible to obtain a lenticular lens sheet having an ultrafine lens pitch of 100 micrometers or less.

Further, the base member 15 is fed as a continuous film or sheet, so that it is continuously, subjected to shaping. Consequently, it is possible to attain improved productivity.

EXAMPLES

Specific examples of a lenticular lens sheet according to the aforementioned first embodiment will be given hereinafter.

Example 1

A lenticular lens sheet 10 according to the above-described first embodiment was prepared, in which the shape of the cross section of the lenticular lens in the lens area 12 was an ellipse, the lens pitch p was 50 micrometers, the transverse diameter a of the ellipse was 24 micrometers, and the longitudinal diameter b of the ellipse was 26 micrometers. An ultraviolet-light-curable resin having a refractive index of 1.55 was used for forming the non-colored layer 12A; the resin was coated onto the base member 15 so that the thickness $t_2$ of the resulting non-colored layer 12A would be 10 micrometers. Further, a mixture obtained by dispersing black pigment in the above-described ultraviolet-light-curable resin was used for forming the colored layer 13; the mixture was coated onto the metal mold roll on which the reverse pattern of the lenticular lens was formed. As the base member 15, a PET film having a thickness $t_3$ of 0.25 mm was used. The lenticular lens sheet 10 was produced in accordance with the production process shown in FIG. 11, by using the production system 50 shown in FIG. 10. In this case, the colored layer 13 having a thickness of 7 μm at the apex thereof was formed by adjusting the nipping pressure of the nipping roll.

Example 2

A lenticular lens sheet 10 was prepared by laminating a transparent film having an antireflection layer 18 to the light-emerging surface 14 of a lenticular lens sheet 10 prepared in accordance with the same manner as in Example 1.

Comparative Example 1

An incident-side single lenticular lens sheet 60 of body-colored type in the same shape as that of the lenticular lens sheet 10 of Example 1, capable of giving screen gain comparable to one given by the lenticular lens sheet 10 of Example 1 was prepared.

Comparative Example 2

A lenticular lens sheet was prepared by forming black stripes with a pitch p of 0.72 mm (black stripe rate: 45%) on the lenticular lens sheet of Comparative Example 1.

Results of Evaluation

The lenticular lens sheets of Example 1 and Comparative Example 1 were respectively combined with a Fresnel lens sheet into which a diffusing agent, acrylic beads having a mean particle diameter of 30 micrometers, had been incorporated, thereby forming rear projection screens. These screens were respectively set in a rear-projection-type television using an LCD light source, and a comparative test was carried out. Specifically, the lenticular lens sheet of Example 1 and that of Comparative Example 1 were set on the right side and left side of the television, respectively, and images projected on the screens were observed in a room lighted by a fluorescent lamp. As a result, it was found that the screen using the lenticular lens sheet of Example 1 was excellent in contrast as compared with the screen using the lenticular lens sheet of Comparative Example 1.

Subsequently, the lenticular lens sheets of Examples 1 and 2 and Comparative Examples 1 and 2 were respectively combined with a Fresnel lens sheet into which a diffusing agent, acrylic beads having a mean particle diameter of 30 micrometers, had been incorporated, thereby forming rear projection screens. The transmittance and reflectance at a wavelength of 550 nm of each of these screens were measured by a spectrophotometer ("UV 2100" manufactured by Shimadzu Corp., Japan), and the transmittance/reflectance ratio was obtained by calculation. As a result, as shown in the following Table 2, the ratio of the screen using the lenticular lens sheet of Example 1 was 4 times or more the ratio of the screen using the lenticular lens sheet of Comparative Example 1 (lenticular lens sheet of body-colored type); and the ratio of the screen using the lenticular lens sheet of Example 2 was considerably higher than that of the screen using the lenticular lens sheet of Comparative Example 2(lenticular lens sheet with black stripes).

TABLE 2

|  | Transmittance [%] | Reflectance [%] | Transmittance/ Reflectance |
|---|---|---|---|
| Example 1 | 60.0 | 6.0 | 10.0 |
| Example 2 | 60.0 | 3.0 | 20.0 |
| Comparative Example 1 | 63.3 | 27.8 | 2.3 |
| Comparative Example 2 | 70.4 | 9.4 | 7.5 |

What is claimed is:

1. A lenticular lens sheet comprising:

a base member in the form of a film or sheet; and a lens area including a plurality of lenticular lenses convexly formed on a light-entering surface of the base member, wherein the lens area is formed of a cured ionizing-radiation-curable resin, a non-colored layer is formed in the base member, or each lenticular lens of the lens area on the base side thereof, and a colored layer is formed in each lenticular lens of the lens area at least at the apex thereof.

2. The lenticular lens sheet according to claim 1, further comprising a substantially transparent front sheet on the light-emerging surface side of the base member.

3. The lenticular lens sheet according to claim 2, further comprising a surface-treatment layer on the front surface of the front sheet.

4. The lenticular lens sheet according to claim 3, wherein the surface-treatment layer includes at, least one of the following layers: an antireflection layer, an antistatic layer, a scratch resistant layer, a polarized light filter layer, an antistaining layer, a magnetic-wave-shielding layer, an antiglaring layer, and a layer functioning as a touch sensor.

5. The lenticular lens sheet according to claim 1, further comprising a surface-treatment layer on the light-emerging surface side of the base member.

6. The lenticular lens sheet according to claim 5, wherein the surface-treatment layer includes at least one of the following layers: an antireflection layer, an antistatic layer, a scratch resistant layer, a polarized light filter layer, an antistaining layer, a magnetic-wave-shielding layer, an antiglaring layer, and a layer functioning as a touch sensor.

7. The lenticular lens sheet according to claim 1, having a lens pitch of no more than 100 micrometers.

8. A process for producing a lenticular lens sheet, comprising the steps of:

coating a non-colored ionizing-radiation-curable resin onto one surface of a base member in the form of a film or sheet;

coating a colored ionizing-radiation-curable resin onto a lens-forming mold on which a lenticular lens pastern has been formed;

nipping the base member against the lens-forming mold with the colored resin and the non-colored resin facing each other; and curing the non-colored resin and the colored resin by applying thereto ionizing radiation.

9. The process for producing a lenticular lens sheet according to claim 8, further comprising the step of drying the non-colored resin coated onto the base member.

10. The process for producing a lenticular lens sheet according to claim 8, therein the fluidity of the non-colored resin coated onto the base member is lower than that of the colored resin at the time when the lens is shaped.

11. The process for producing a lenticular lens sheet according to claim 8, further comprising the step of integrating the base member and a substantially transparent front sheet by means of coating and/or lamination.

12. The process for producing a lenticular lens sheet according to claim 8, further comprising the step of forming a surface-treatment layer on the light-emerging surface side of the base member by means of coating and/or lamination.

13. The process for producing a lenticular lens sheet according to claim 11, further comprising the step of forming a surface-treatment layer on the front surface of the front sheet by means of coating and/or lamination.

14. The process for producing a lenticular lens sheet according to claim 8, wherein the base member is fed as a continuous film or sheet.

* * * * *